(12) United States Patent
Sakurai

(10) Patent No.: US 11,469,450 B2
(45) Date of Patent: Oct. 11, 2022

(54) METHOD FOR MANUFACTURING BATTERY AND BATTERY

(71) Applicant: TOYOTA JIDOSHA KABUSHIKI KAISHA, Toyota (JP)

(72) Inventor: Takahiro Sakurai, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 185 days.

(21) Appl. No.: 16/841,822

(22) Filed: Apr. 7, 2020

(65) Prior Publication Data

US 2020/0335828 A1 Oct. 22, 2020

(30) Foreign Application Priority Data

Apr. 22, 2019 (JP) .............................. JP2019-080997

(51) Int. Cl.
*H01M 10/0587* (2010.01)
*H01M 50/538* (2021.01)
(Continued)

(52) U.S. Cl.
CPC ....... *H01M 10/0587* (2013.01); *B23K 11/002* (2013.01); *B23K 11/11* (2013.01);
(Continued)

(58) Field of Classification Search
CPC .......... H01M 50/103; H01M 10/0587; H01M 50/538; H01M 50/463; H01M 50/40; H01M 10/0431; Y02E 60/10; Y02P 70/50; B23K 35/02; B23K 35/0261; B23K 35/0288; B23K 2101/36; B23K 11/002;
(Continued)

(56) References Cited

U.S. PATENT DOCUMENTS

2009/0148756 A1* 6/2009 Specht .................... H01M 6/16
429/94
2015/0372343 A1* 12/2015 Mitsuhashi ......... H01M 10/446
429/163
(Continued)

FOREIGN PATENT DOCUMENTS

JP 2005302466 A 10/2005
JP 2007073317 A 3/2007
(Continued)

*Primary Examiner* — Jonathan G Jelsma
*Assistant Examiner* — Omar M Kekia
(74) *Attorney, Agent, or Firm* — Dickinson Wright, PLLC

(57) ABSTRACT

A battery manufacturing method includes: winding positive and negative electrode plates and a separator to form a wound electrode assembly; cutting unwound portions of the positive and negative electrode plates and the separator such that the separator constitutes an outermost layer of the wound electrode assembly when the winding is completed; further winding around the wound electrode assembly the cut unwound portions; fixing a part of a terminal end of the separator in a lateral direction to the wound electrode assembly; and performing heat welding on parts of both lateral ends of an outermost portion of the separator in the wound electrode assembly, which are located above an electrode active material-uncoated portion of the positive or negative electrode plate to fix the lateral ends to the wound electrode assembly.

4 Claims, 8 Drawing Sheets

(51) Int. Cl.

| | |
|---|---|
| H01M 50/466 | (2021.01) |
| H01M 50/40 | (2021.01) |
| H01M 10/04 | (2006.01) |
| H01M 50/103 | (2021.01) |
| B65H 69/08 | (2006.01) |
| B23K 35/02 | (2006.01) |
| B23K 101/36 | (2006.01) |
| B23K 11/00 | (2006.01) |
| B23K 11/11 | (2006.01) |
| B23K 11/30 | (2006.01) |
| B23K 28/00 | (2006.01) |

(52) U.S. Cl.
CPC .......... *B23K 11/3009* (2013.01); *B23K 28/00* (2013.01); *B23K 35/02* (2013.01); *B23K 35/0261* (2013.01); *B23K 35/0288* (2013.01); *B23K 2101/36* (2018.08); *B65H 69/08* (2013.01); *H01M 10/0431* (2013.01); *H01M 50/103* (2021.01); *H01M 50/40* (2021.01); *H01M 50/466* (2021.01); *H01M 50/538* (2021.01); *Y02E 60/10* (2013.01); *Y02P 70/50* (2015.11)

(58) Field of Classification Search
CPC ..... B23K 11/11; B23K 11/3009; B23K 28/00; B23K 2013/172
USPC .......................................................... 429/94
See application file for complete search history.

(56) References Cited

U.S. PATENT DOCUMENTS

| | | | |
|---|---|---|---|
| 2016/0118682 A1* | 4/2016 | Iizuka | H01M 10/0587 |
| | | | 429/94 |
| 2017/0092980 A1* | 3/2017 | Wakimoto | H01M 50/103 |

FOREIGN PATENT DOCUMENTS

| | | |
|---|---|---|
| JP | 2012022862 A | 2/2012 |
| JP | 2015088247 A | 5/2015 |
| JP | 2017033830 A | 2/2017 |
| JP | 2017059395 A | 3/2017 |
| WO | 2012/020658 A1 | 2/2012 |

\* cited by examiner

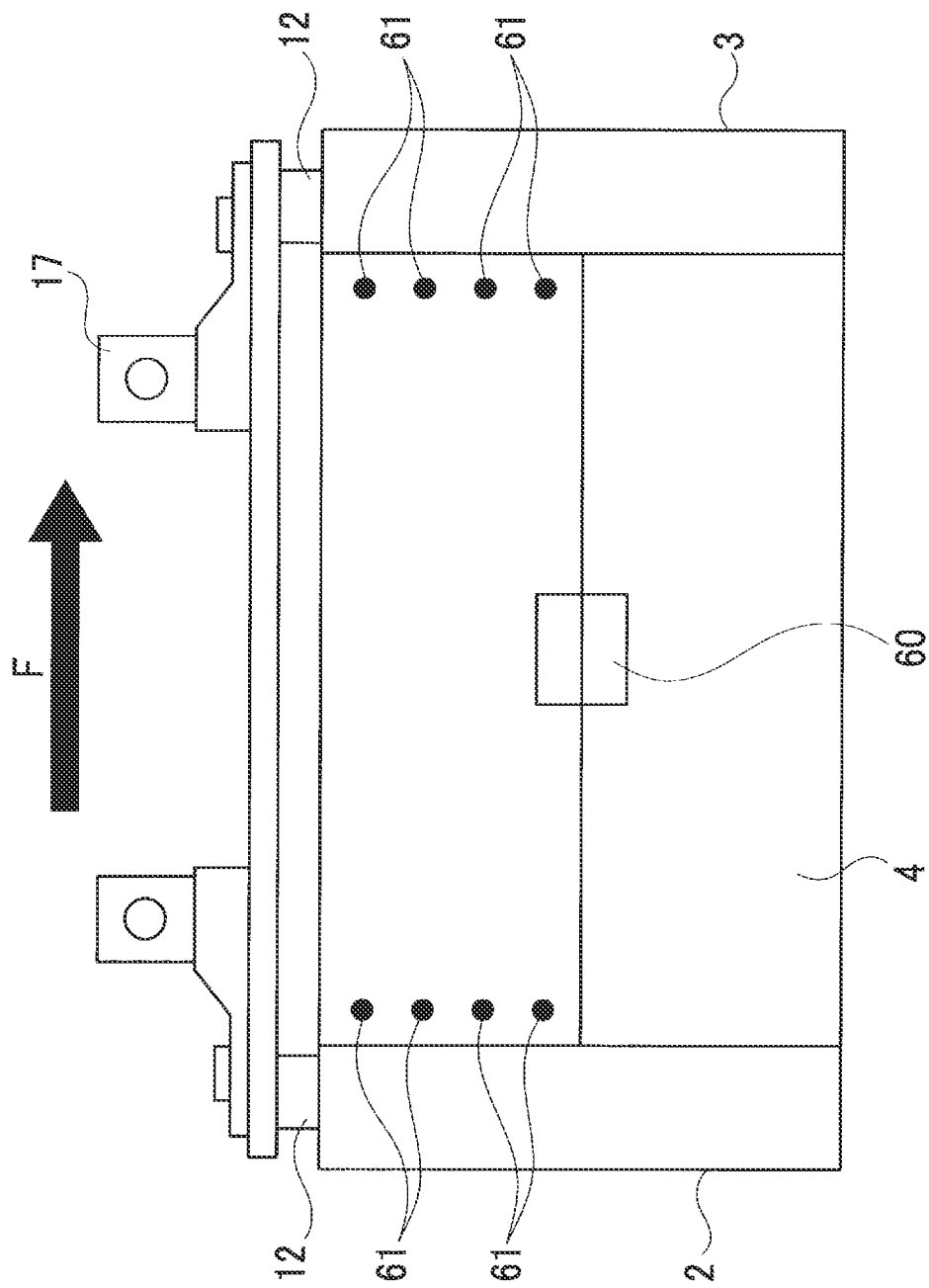

METHOD FOR MANUFACTURING BATTERY AND BATTERY

INCORPORATION BY REFERENCE

The disclosure of Japanese Patent Application No. 2019-080997 filed on Apr. 22, 2019 including the specification, drawings and abstract is incorporated herein by reference in its entirety.

BACKGROUND

1. Technical Field

The disclosure relates to batteries having a wound electrode assembly formed by winding electrode plates and a separator, and methods for manufacturing the same.

2. Description of Related Art

An example of this type of battery and a method for manufacturing such a battery is described in Japanese Patent Application Publication No. 2017-059395. In the battery described in Japanese Patent Application Publication No. 2017-059395, the terminal end of a separator in the outermost layer of a wound electrode assembly is taped with an adhesive tape so that the outermost portion of the separator will not easily be turned up.

SUMMARY

In the above technique, however, the outermost portion of the separator may be turned up. This is because both lateral ends of the terminal end of the separator are not fixed. When the wound electrode assembly is inserted into an outer case with the outermost portion of the separator being turned up even partially, the wound electrode assembly is subjected to stress different from usual during the insertion. This may cause damage to the separator and internal short-circuit.

The separator should not be turned up if the terminal end of the separator is taped with the adhesive tape along the entire width of the separator. However, in the regions in the lateral ends of the separator, there are voids between the electrode plates of the wound electrode assembly. Such regions are regions where only one of the positive and negative electrodes is present and are each located above a part of the electrode plate which is not coated with an electrode active material layer. Accordingly, when the adhesive tape is applied by pressing it against the region having many voids, this may damage the electrode plates.

The disclosure provides a battery and a method for manufacturing the same in which neither turning up of the outermost portion of a separator nor damage to electrode plates occur during manufacturing.

A first aspect of the disclosure relates to a method for manufacturing a battery. The battery includes a wound electrode assembly formed by winding positive and negative electrode plates and a separator. Each of the positive and negative electrode plates is a strip of current collector foil having an electrode active material-coated portion and an electrode active material-uncoated portion. The electrode active material-uncoated portion is located in one lateral end of the current collector foil. The separator is in the form of a strip and has such a width that the separator completely covers the electrode active material-coated portions and partially covers the electrode active material-uncoated portions. The wound electrode assembly has a central portion, a positive electrode connection portion, and a negative electrode connection portion. The central portion is a portion where all of the positive and negative electrode plates and the separator are present. The positive electrode connection portion is a portion where only a part of the electrode active material-uncoated portion of the positive electrode plate, which protrudes toward one side of the central portion, is present. The negative electrode connection portion is a portion where only a part of the electrode active material-uncoated portion of the negative electrode plate, which protrudes toward another side of the central portion, is present. The method includes: winding the positive and negative electrode plates and the separator to form the wound electrode assembly; cutting unwound portions of the positive and negative electrode plates and the separator such that the separator constitutes an outermost layer of the wound electrode assembly when the winding is completed; further winding around the wound electrode assembly the cut unwound portions of the positive and negative electrode plates and the separator which connect to the wound electrode assembly; fixing a part of a terminal end of the separator in a lateral direction to the wound electrode assembly, the terminal end being a cut end of the separator; and performing heat welding on parts of both lateral ends of an outermost portion of the separator in the wound electrode assembly which are located above the electrode active material-uncoated portion of the positive electrode plate or the electrode active material-uncoated portion of the negative electrode plate to fix the lateral ends to the wound electrode assembly.

In the method of the above aspect, the wound electrode assembly is produced by using the positive and negative electrode plates and the separator in the form of a strip. Each of the positive and negative electrode plates is a strip of current corrector foil having the electrode active material-coated portion and having the electrode active material-uncoated portion its one lateral end. The separator has such a width that the separator completely covers the electrode active material-coated portions and partially covers the electrode active material-uncoated portions. First, the electrode plates and the separator are wound to form the wound electrode assembly. At this time, the wound electrode assembly is formed so that it has the central portion, the positive electrode connection portion on one side of the central portion, and the negative electrode connection portion on the other side of the central portion. Unwound portions of the positive and negative electrode plates and the separator are cut before completion of the winding so that the separator constitutes the outermost layer of the wound electrode assembly when the winding is completed. After the winding is completed, a part of the terminal end of the separator in the lateral direction is fixed to the wound electrode assembly. Moreover, both lateral ends of the outermost portion of the separator are fixed to the wound electrode assembly by heat welding. Heat welded portions are portions located above the electrode active material-uncoated portion of the positive electrode plate or the electrode active material-uncoated portion of the negative electrode plate. Since the part of the terminal end in the lateral direction is fixed to the wound electrode assembly before the heat welding, the separator has been subjected to tension at the time the heat welding is started. The separator will therefore not be turned up, and damage to the electrode plates and the separator will not occur.

In the method of the above aspect, the part of the terminal end in the lateral direction may be fixed to the wound electrode assembly by applying an adhesive tape to the wound electrode assembly such that the adhesive tape extends over the part of the terminal end.

In the method of the above aspect, the heat welding may be performed using a probe having a front face at a tip end of the probe, the front face being a tilted surface. In the heat welding, the front face heated to a temperature equal to or higher than a melting point of the separator may be brought into contact with an outer surface of the outermost portion of the separator with a most distal part of the tilted front face of the probe facing a side farther from the electrode active material-coated portion of the positive electrode plate and the electrode active material-coated portion of the negative electrode plate and a most proximal part of the tilted front face of the probe facing a side closer to the electrode active material-coated portion of the positive electrode plate and the electrode active material-coated portion of the negative electrode plate. Damage to the electrodes and the separator during the heat welding is thus more reliably restrained.

A second aspect of the disclosure relates to a battery. The battery includes a wound electrode assembly formed by winding positive and negative electrode plates and a separator. Each of the positive and negative electrode plates is a strip of current collector foil having an electrode active material-coated portion and an electrode active material-uncoated portion. The electrode active material-uncoated portion is located in one lateral end of the current collector foil. The separator is in the form of a strip. The wound electrode assembly has a central portion, a positive electrode connection portion, and a negative electrode connection portion. The central portion is a portion where all of the positive and negative electrode plates and the separator are present. The positive electrode connection portion is a portion where only a part of the electrode active material-uncoated portion of the positive electrode plate which protrudes toward one side of the central portion is present. The negative electrode connection portion is a portion where only a part of the electrode active material-uncoated portion of the negative electrode plate which protrudes toward another side of the central portion is present. The separator constitutes an outermost layer of the wound electrode assembly. An outermost portion of the separator in the wound electrode assembly has heat welded portions in parts of both lateral ends of the outermost portion, which are located above the electrode active material-uncoated portion of the positive electrode plate or the electrode active material-uncoated portion of the negative electrode plate, the heat welded portions of the separator being fixed to the wound electrode assembly.

In the battery of the above aspect, the heat welded portions is formed in both lateral ends of the separator in the outermost layer of the wound electrode assembly. Both lateral ends of the outermost layer of the separator are thus fixed to the wound electrode assembly, so that the separator will not be turned up. In this battery, there is no adverse effect associated with turning up of the separator, and neither the electrode plates nor the separator is damaged during the fixing process.

The battery of the above aspect may further include an adhesive tape applied to the wound electrode assembly such that the adhesive tape extends over a part of a terminal end of the separator in the outermost layer of the wound electrode assembly. Turning up of the separator is thus more satisfactorily restrained.

With the above configuration, a battery and a method for manufacturing the same are provided in which neither turning up of the outermost portion of a separator nor damage to electrode plates occur during manufacturing.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 8 is a front view of the wound electrode assembly being transferred for a welding process.

DETAILED DESCRIPTION OF EMBODIMENTS

Figure 1:
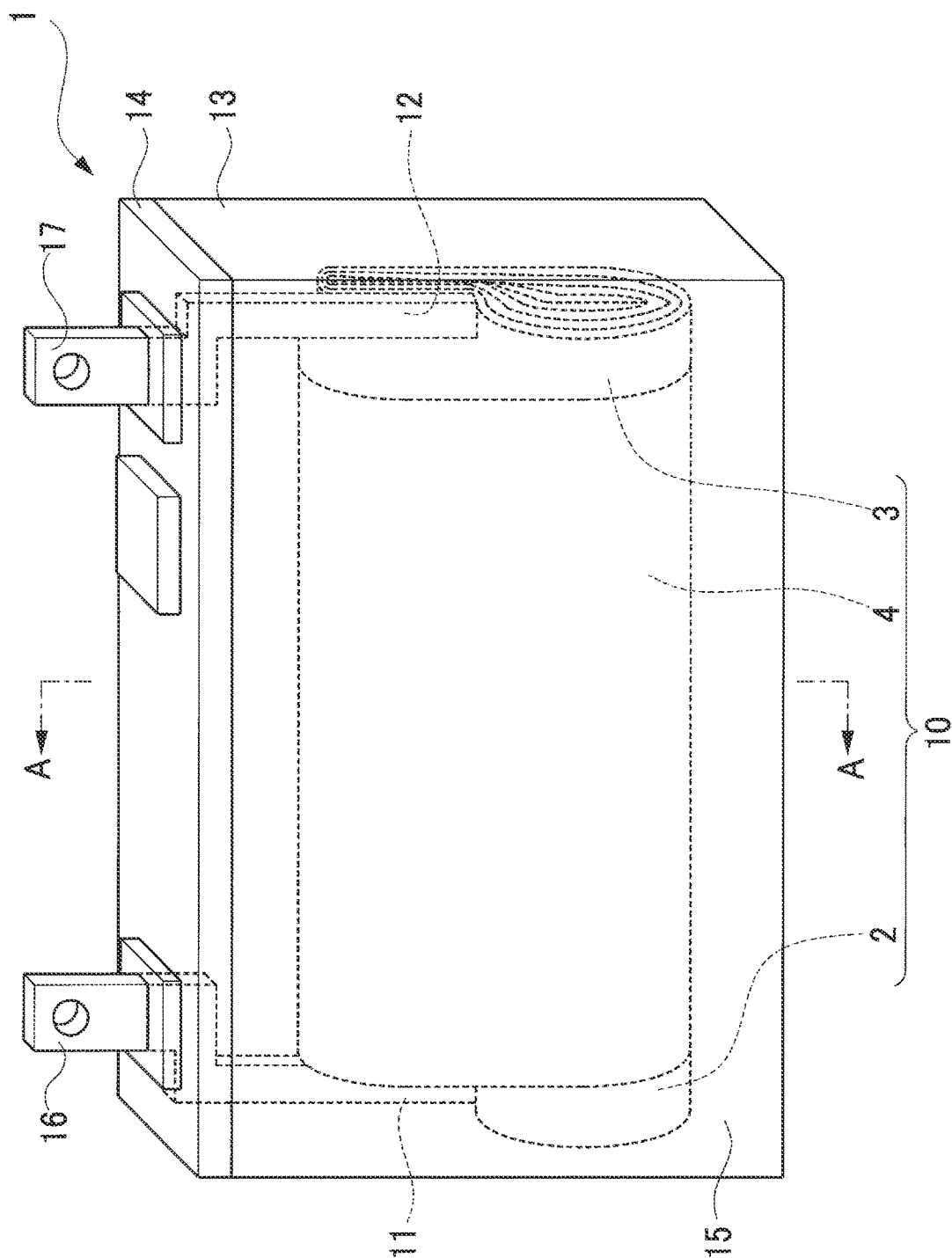
FIG. 1 is a transparent perspective view illustrating the overall configuration of a battery according to an embodiment.

An embodiment of the disclosure will be described in detail with reference to the accompanying drawings. In the present embodiment, the disclosure is embodied as a battery shown in FIG. 1 and a method for manufacturing the battery. A battery 1 shown in FIG. 1 is a wound electrode assembly 10 enclosed in a rectangular outer case 13. The outer case 13 has a lid 14 and a body 15. The battery 1 is provided with positive and negative external terminals 16, 17. The external terminals 16, 17 partially project from the outer case 13. In the outer case 13, the external terminals 16, 17 and the wound electrode assembly 10 are connected by current collector members 11, 12.

Figure 2:
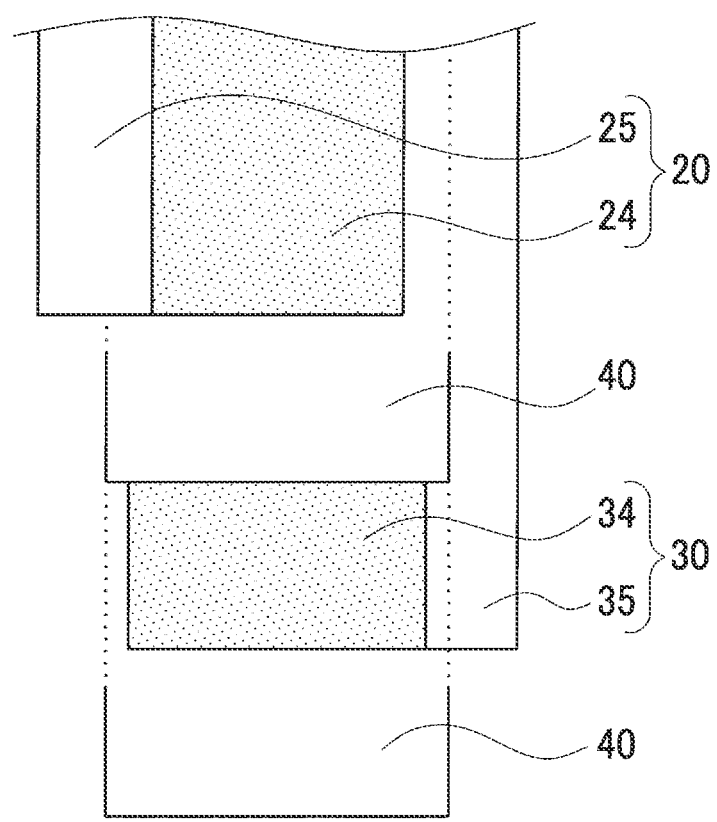
FIG. 2 is a schematic diagram of electrode plates and separators which form a wound electrode assembly.

The wound electrode assembly 10 is formed by winding strips of positive and negative electrode plates together with strips of separators. Each of the positive and negative electrode plates of the wound electrode assembly 10 is conductive current collector foil partially coated with an electrode active material layer. In the wound electrode assembly 10, as shown in FIG. 2, a positive electrode plate 20 and a negative electrode plate 30 are placed such that a coated portion 24 of the positive electrode plate 20 and a coated portion 34 of the negative electrode plate 30 overlap each other. Each of the positive and negative electrode plates 20, 30 has an uncoated portion 25, 35 at one end in its lateral direction (the horizontal direction in FIG. 2). In the wound electrode assembly 10, the uncoated portions 25, 35 protrude in opposite directions.

In the wound electrode assembly 10, the positive and negative electrode plates 20, 30 are separated by two separators 40. The separators 40 have such a width that the separators 40 completely cover the coated portions 24, 34 and partially cover the uncoated portions 25, 35. That is, the separators 40 have such a width that the separators 40 completely cover the coated portions 24, 34 and that the uncoated portions 25, 35 partially protrude beyond the separators 40. Accordingly, a region where the separators 40 only overlap the uncoated portion 25 and a region where the separators 40 only overlap the uncoated portion 35 are present near both lateral ends of the separators 40.

Figure 3:
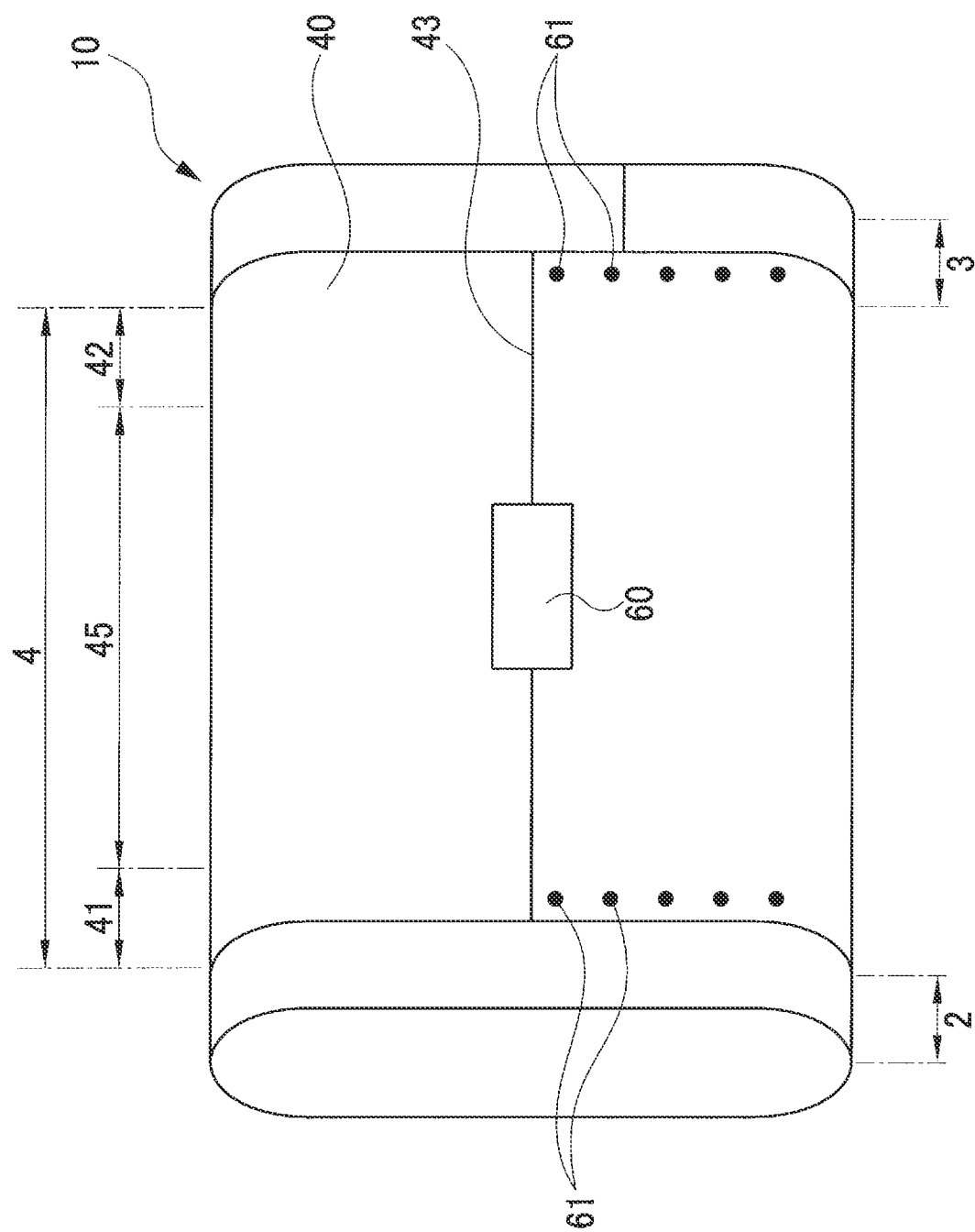
FIG. 3 is a perspective view illustrating only the wound electrode assembly that is a component of the battery according to the embodiment.

In the wound electrode assembly 10, the outermost layer of the winding is neither the positive electrode plate 20 nor the negative electrode plate 30 but is the separator 40. This is to restrain direct contact of the positive electrode plate 20 and the negative electrode plate 30 of the wound electrode assembly 10 with the outer case 13. The wound electrode assembly 10 itself has a flat shape as shown in FIG. 3. The wound electrode assembly 10 shown in FIG. 3 is the wound electrode assembly 10 before attachment of the current collector members 11, 12.

The wound electrode assembly 10 in FIG. 3 has a central portion 4, a positive electrode connection portion 2, and a negative electrode connection portion 3. The central portion 4 is a portion whose outermost layer is covered by the separator 40 and where both the positive electrode plate 20 and the negative electrode plate 30 are present. As described with reference to FIG. 2, there are regions 41, 42 near both lateral ends of the central portion 4, in which the coated portions 24, 34 are not present. The uncoated portion 25 of the positive electrode plate 20 is present in the region 41, and the uncoated portion 35 of the negative electrode plate 30 is present in the region 42. A region 45 between the regions 41, 42 is a region where the coated portions 24, 34 are present and which actually contributes to power generation. The positive electrode connection portion 2 is a portion where a part of the uncoated portion 25 of the positive electrode plate 20 which protrudes beyond the separators 40 is present. The current collector member 11 is attached to the positive electrode connection portion 2. The negative electrode connection portion 3 is a portion where a part of the uncoated portion 35 of the negative electrode plate 30 which protrudes beyond the separators 40 is present. The current collector member 12 is attached to the negative electrode connection portion 3.

In the wound electrode assembly 10 shown in FIG. 3, a terminal end 43 of the outermost layer of the separator 40 is exposed in the region of the central portion 4. In the central portion 4, an adhesive tape 60 is applied so as to extend over the terminal end 43. The adhesive tape 60 is applied between the positive electrode connection portion 2 and the negative electrode connection portion 3. The terminal end 43 of the outermost layer of the separator 40 is fixed to the wound electrode assembly 10 with the adhesive tape 60.

In the wound electrode assembly 10 of FIG. 3, the outermost layer of the separator 40 has heat welded portions 61 near its both lateral ends near the terminal end 43. The heat welded portions 61 are marks left when the outermost layer of the separator 40 is heat welded to the wound electrode assembly 10. Since the heat welded portions 61 are formed at these positions, turning up of the terminal end 43 of the separator 40 is restrained along the entire width of the separator 40. The outermost layer of the separator 40 of the wound electrode assembly 10 is therefore not turned up in the battery 1 of FIG. 1 as well.

In the wound electrode assembly 10, the heat welded portions 61 are formed in rows on both lateral sides of the outermost layer of the separator 40 at a plurality of positions from the terminal end 43 side. The heat welded portions 61 are formed in the regions 41, 42 in FIG. 3. The coated portions 24, 34 are therefore not present under the heat welded portions 61. Accordingly, an electrode active material of the coated portions 24, 34 is not damaged by the heat welding. The power storage capability of the wound electrode assembly 10 is therefore not reduced by the heat welding.

Figure 4:
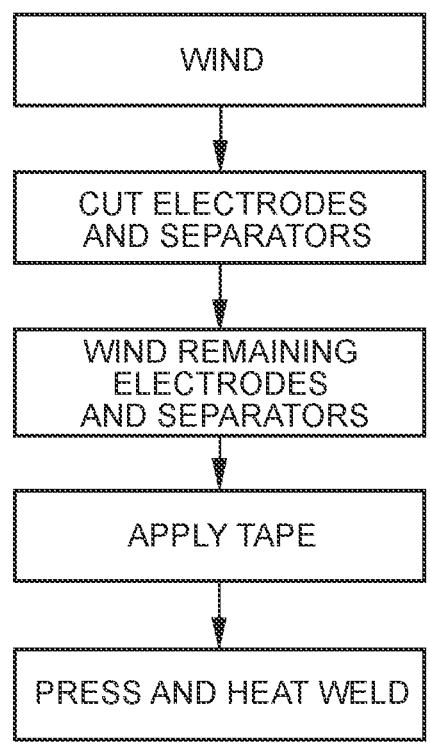
FIG. 4 is a flowchart illustrating how to manufacture the wound electrode assembly.
Figure 5:
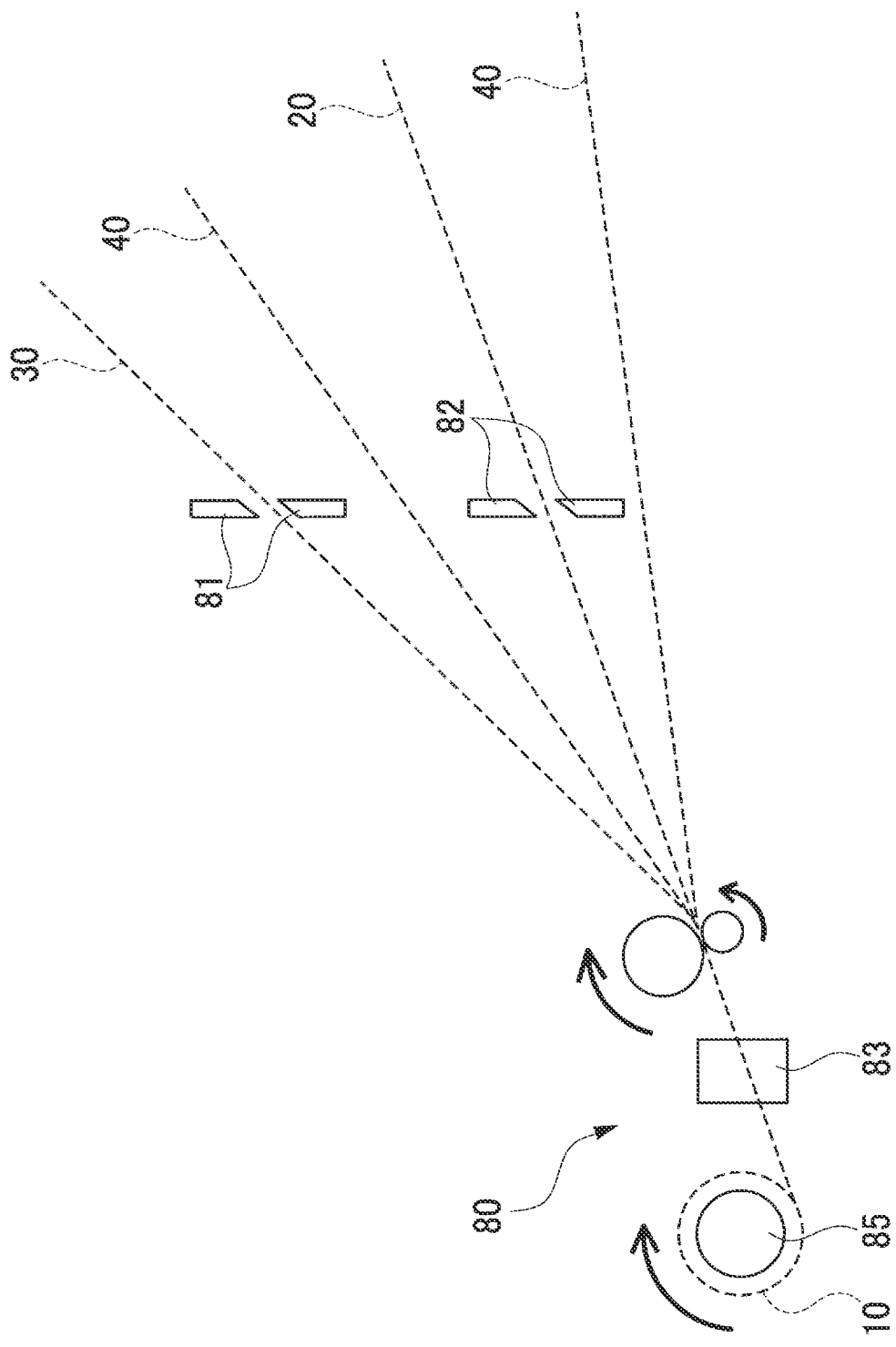
FIG. 5 is a schematic diagram illustrating winding and cutting processes.

Next, a method for manufacturing the battery 1 will be described. Features of the method for manufacturing the battery 1 lie in manufacturing of the wound electrode assembly 10. The wound electrode assembly 10 is manufactured as shown in FIG. 4. "Wind" in FIG. 4 is, e.g., a process of winding the positive electrode plate 20, the negative electrode plate 30, and the two separators 40 using a winding machine 80 as shown in FIG. 5. In this process, the positive electrode plate 20, the negative electrode plate 30, and the two separators 40 are wound up on a winding core 85. The wound electrode assembly 10 is thus formed on the surface of the winding core 85.

"Cut electrodes and separators" in FIG. 4 is a process of cutting the positive electrode plate 20, the negative electrode plate 30, and the two separators 40. In FIG. 5, a positive electrode plate cutter 82, a negative electrode plate cutter 81, and a separator cutter 83 are shown as configurations for cutting. The positive electrode plate 20, the negative electrode plate 30, and the separators 40 are cut in their lateral direction with these cutters. In the present embodiment, the positive electrode plate 20 and the negative electrode plate 30 are first cut with the positive electrode plate cutter 82 and the negative electrode plate cutter 81 before cutting of the separators 40. The positive electrode plate 20 and the negative electrode plate 30 are cut at such a position that the total extension of each of the positive electrode plate 20 and the negative electrode plate 30 extending to the winding core 85 is equal to the length of a single roll of the wound electrode assembly 10.

When the positive electrode plate 20 and the negative electrode plate 30 are cut, the positive electrode plate 20, the negative electrode plate 30, and the two separators 40 are further wound up on the winding core 85. The separators 40 are then cut with the separator cutter 83. Specifically, after the positive electrode plate 20 and the negative electrode plate 30 are cut, the terminal ends of the cut positive and negative electrode plates 20, 30 pass the separator cutter 83 and the entire lengths of the cut positive and negative electrode plates 20, 30 are wound up together with the separators 40 on the winding core 85. After the entire lengths of the cut positive and negative electrode plates 20, 30 are wound up together with the separators 40 on the winding core 85, the separators 40 are cut as soon as the separators 40 of a length equal to or larger than the outer circumference of the wound electrode assembly 10 after completion of the winding pass the separator cutter 83. At this time, both of the separators 40 are cut with the separator cutter 83.

"Wind remaining electrodes and separators" in FIG. 4 is a process of completing winding-up by winding up on the winding core 85 the remaining portions of the cut positive and negative electrode plates 20, 30 and the remaining portions of the cut separators 40 extending to the winding core 85. This process includes winding up the remaining parts of the cut positive and negative electrode plates 20, 30 in addition to winding up the remaining parts of the cut separators 40. By this final winding-up, the separator 40 constitutes the entire outermost layer of the wound electrode assembly 10.

Figure 6:
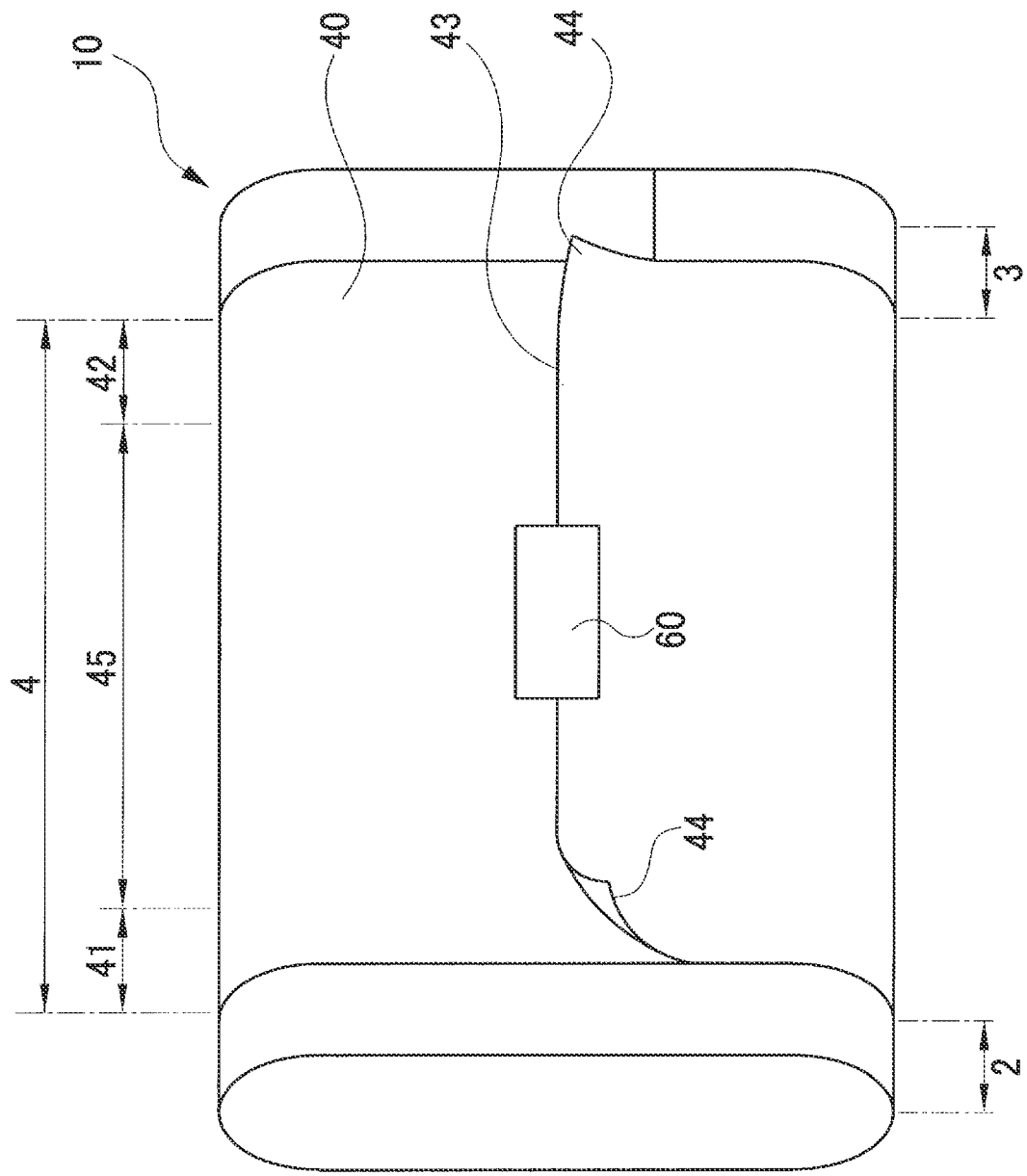
FIG. 6 is a perspective view of the wound electrode assembly with a turned-up separator.

"Apply Tape" in FIG. 4 is a process of applying the adhesive tape 60 shown in FIG. 3. The adhesive tape 60 is applied at the position described above with reference to FIG. 3. The terminal end 43 of the separator 40 is thus fixed to the wound electrode assembly 10 with the adhesive tape 60. In this state, the outermost portion of the separator 40 in the wound electrode assembly 10 is subjected to tension. Since heating is not particularly required to apply the adhesive tape 60, the application of the adhesive tape 60 does not affect the electrode active material of the coated portions 24, 34. In this state, however, lateral ends 44 of the terminal end 43 of the separator 40 may be turned up as shown in FIG. 6. FIG. 6 illustrates the lateral ends 44 being turned up after pressing described below.

"Press and heat weld" in FIG. 4 is a process of processing the wound electrode assembly 10 in a manner as shown in FIG. 3 after the process of applying the adhesive tape 60. This process includes pressing and heat welding. Pressing is forming the hollow cylindrical wound electrode assembly 10 removed from the winding core 85 into the flat shape shown in FIGS. 1 and 3. Heat welding is forming the heat welded portions 61 shown in FIG. 3 on the wound electrode assembly 10.

Figure 7:
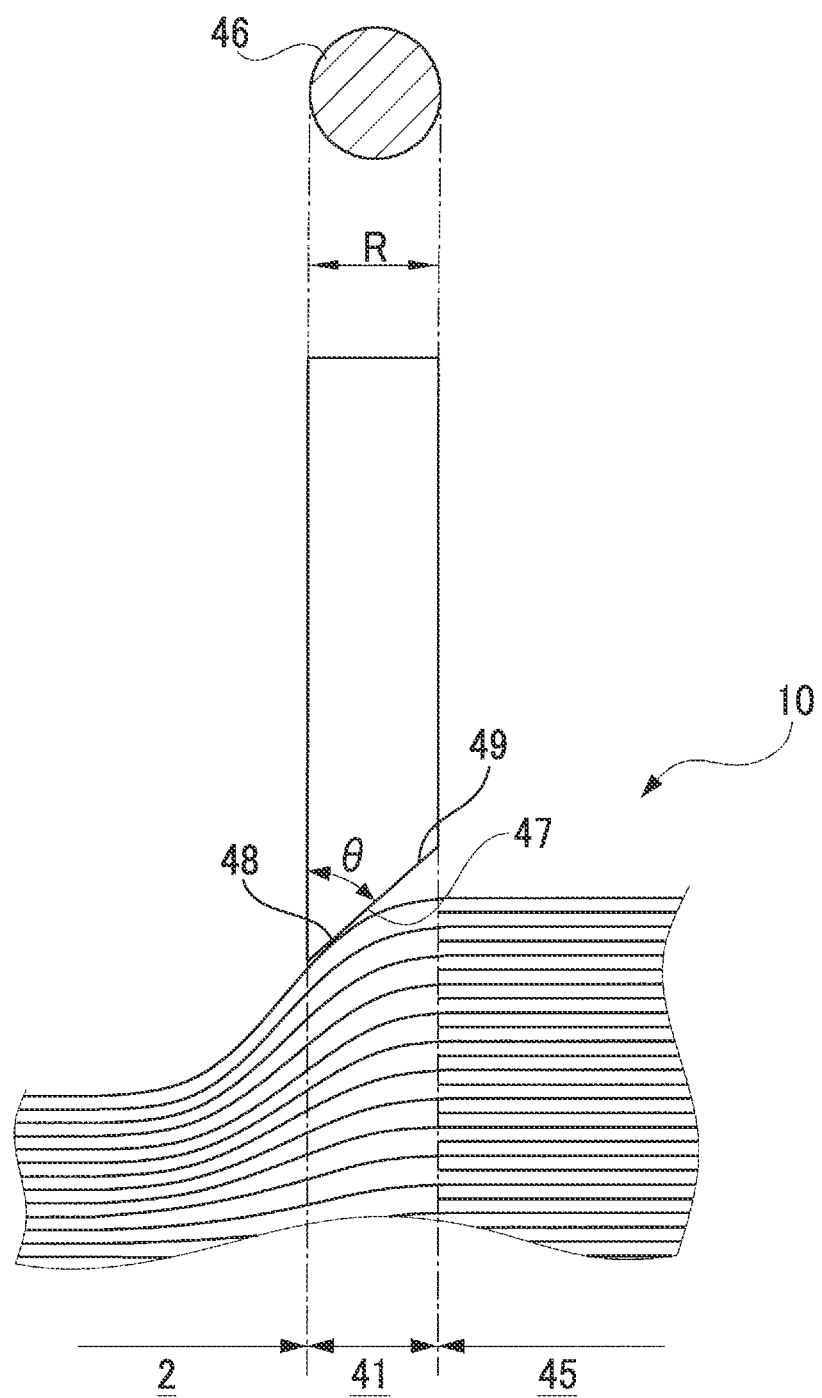
FIG. 7 is a diagram illustrating heat welding using a heat welding probe.

This heat welding is performed using a heat welding probe 46 shown in FIG. 7. FIG. 7 also shows a part of the wound electrode assembly 10 in addition to the heat welding probe 46. The part of the wound electrode assembly 10 shown in FIG. 7 is the region 41 and its vicinity shown in FIG. 3 and is shown in section in the horizontal direction in FIG. 3. In FIG. 7, the heat welding probe 46 is pressed against the surface of the region 41 of the wound electrode assembly 10. The heat welding probe 46 is a cylindrical member. The heat welding probe 46 has a front face 47 at its tip end, and the front face 47 of the heat welding probe 46 contacts the wound electrode assembly 10. The front face 47 is a tilted surface.

As shown in section in FIG. 7, the region 41 of the wound electrode assembly 10 has a tilted surface when compressed in the thickness direction by the heat welding probe 46. This is because the configuration of the wound electrode assembly 10 is different among the region 45, the region 41, and the positive electrode connection portion 2. As described above, the region 45 is a region where both the positive electrode plate 20 and the negative electrode plate 30 are present and the coated portions 24, 34 overlap each other. Accordingly, the region 45 has almost no void therein and is the thickest even in the compressed state. The positive electrode connection portion 2 is a region where only the uncoated portion 25 of the positive electrode plate 20 is present. Accordingly, the positive electrode connection portion 2 has many voids therein and is fairly thin in the compressed state. The region 41 is a region where the uncoated portion 25 of the positive electrode plate 20 and the separators 40 are present. Accordingly, regarding the amount of void and the thickness in the compressed state, the region 41 is intermediate between the region 45 and the positive electrode connection portion 2. The region 41 therefore has a tilted surface when the heat welding probe 46 is pressed against the region 41.

The front face 47 of the heat welding probe 46 is a tilted surface because the region 41 has a tilted surface when compressed as described above. The heat welding probe 46 is used such that the most distal part 48 of the front face 47 faces the positive electrode connection portion 2 side and the most proximal part 49 of the front face 47 faces the region 45 side. That is, the heat welding probe 46 is used such that the most distal part 48 of the front face 47 faces the side farther from the coated portions 24, 34 and the most proximal part 49 of the front face 47 faces the side closer to the coated portions 24, 34. It is desirable that the diameter R of the heat welding probe 46 be equal to or smaller than the width of the region 41.

When performing heat welding, the heat welding probe 46 is heated to a temperature equal to or higher than the melting point of the separators 40. Heat welding is performed by pressing the heated heat welding probe 46 against the region 41. The heat welded portions 61 are thus formed on the wound electrode assembly 10. As the heat welded portions 61 are formed on the wound electrode assembly 10, the lateral ends 44 shown in FIG. 6, will not even be turned up, and the positive electrode connection portion 2 is compressed as shown in FIG. 7. This makes it easier to perform a subsequent process of attaching the current collector member 11.

The disclosure has the following effects on the heat welding. The pressing force of the heat welding probe 46 against the wound electrode assembly 10 need not be as large as the pressing force that is applied to the wound electrode assembly 10 when applying the adhesive tape 60. This is because, in the heat welding, the separators 40 are melted and easily fused with the underlying layer to form the heat welded portions 61. Accordingly, although the region 41 has more voids than the region 45 as described above, there is almost no risk that the separators 40 and the positive electrode plate 20 will be damaged by pressing the heat welding probe 46 against the region 41.

The front face 47 being a tilted surface and oriented as described above is advantageous in that it will not damage the separators 40 and the positive electrode plate 20. The tilt angle θ of the front face 47 is suitably in the range of 30° to 60°. When the tilt angle θ is too large (close to a flat surface), damage to the separators 40 etc. located on the side closer to the region 45 may not be sufficiently restrained. When the tilt angle θ is too small (excessively steep), damage to the separators 40 etc. located on the side farther from the region 45 may not be sufficiently restrained. The coated portions 24, 34 are hardly affected by heat of the heat welding. This is because of the above relationship between the diameter R of the heat welding probe 46 and the width of the region 41.

Although FIG. 7 only shows the positive electrode side, the same applies to the negative electrode side (the region 42). There is no particular problem even if the adhesive tape 60 peels off after the heat welded portions 61 are formed. Accordingly, a process of removing the adhesive tape 60 may or may not be included. In the case where the process of removing the adhesive tape 60 is not included, the wound electrode assembly 10 need not be regarded as a defective product even if the adhesive tape 60 disappears.

The wound electrode assembly 10 in the state shown in FIG. 3 as described above is then provided for the process of attaching the current collector members 11, 12 to the wound electrode assembly 10 and the process of enclosing the wound electrode assembly 10 in the outer case 13. The battery 1 of FIG. 1 is thus obtained. More specifically, the current collector members 11, 12 are first attached to the positive and negative electrode connection portions 2, 3. The lid 14 of the outer case 13 and the external terminals 16, 17 are also attached in addition to the current collector members 11, 12. Next, the wound electrode assembly 10 is inserted into the body 15 of the outer case 13. The lid 14 and the body 15 of the outer case 13 are then joined together. Subsequently, an electrolyte is injected.

After the process of attaching the current collector members 11, 12 to the wound electrode assembly 10, the wound electrode assembly 10 is transferred for the process of inserting the wound electrode assembly into the body 15 of the outer case 13. During the transfer of the wound electrode assembly 10, the terminal end 43 of the outermost layer of the separator 40 is subjected to the action that attempts to turn up the terminal end 43 of the separator 40 as shown in FIG. 6. This is due to inertia and air resistance. As shown in FIG. 8, the transfer direction F may be the same as the lateral direction of the wound electrode assembly 10 (the horizontal direction in FIG. 3), particularly depending on the configuration of manufacturing equipment. In this case, the terminal end 43 of the separator 40 is especially likely to be turned up. In the present embodiment, however, since the heat welded portions 61 are formed as described above, the terminal end 43 of the separator 40 is effectively restrained from being turned up. Accordingly, no defect resulting from turning up of the terminal end 43 of the separator 40 will occur in the finished battery 1 shown in FIG. 1. Since the heat welded portions 61 are formed in the regions 41, 42 where the coated portions 24, 34 are not present, the power storage capability will not be reduced.

As described in detail above, according to the present embodiment, the separator 40 constitutes the outermost layer of the wound electrode assembly 10, and the terminal end 43 is not only fixed with the adhesive tape 60 and but also is fixed by heat welding that is performed on the regions near both lateral ends of the terminal end 43. The method for manufacturing a battery is thus implemented which restrains turning up of the outermost layer of the separator 40 along its entire lateral length and restrains damage to the separators 40, the positive electrode plate 20, and the negative electrode plate 30. The battery 1 is also implemented in which the outermost layer of the separator 40 is not turned up along its entire lateral length and the separators 40, the positive electrode plate 20, and the negative electrode plate 30 are not damaged.

The present embodiment is merely illustrative and does not limit the disclosure in any way. Accordingly, various improvements and modifications can be made to the disclosure without departing from the spirit and scope of the disclosure. For example, the battery 1 may be of any type as long as it uses positive and negative electrode plates, each made of current collector foil partially coated with an electrode active material layer, and a separator. Examples of the battery 1 include a lithium-ion battery, a nickel metal hydride battery, and a solid-state battery.

In the above embodiment, the wound electrode assembly 10 and the battery 1 have a flat (rectangular) overall shape. However, the wound electrode assembly 10 and the battery 1 may have a cylindrical overall shape. Although the separator 40 constitutes the outermost layer of the wound electrode assembly 10 in the above embodiment, the separator 40 need only constitute the two or more outermost layers of the wound electrode assembly 10. The front face 47 of the heat welding probe 46 is a tilted surface because the region 41 has a tilted surface when compressed as described above. The tilt angle θ is more preferably in the range of 40° to 50°. Although the terminal end 43 of the separator 40 in the wound electrode assembly 10 faces upward in FIG. 3 and faces downward in FIG. 8, the terminal end 43 may face either direction.

What is claimed is:

1. A method for manufacturing a battery, the battery including a wound electrode assembly formed by winding positive and negative electrode plates and a separator, each of the positive and negative electrode plates being a strip of current collector foil having an electrode active material-coated portion and an electrode active material-uncoated portion, the electrode active material-uncoated portion being located in one lateral end of the current collector foil, the separator being in a form of a strip and having such a width that the separator completely covers the electrode active material-coated portions and partially covers the electrode active material-uncoated portions, the wound electrode assembly having a central portion, a positive electrode connection portion, and a negative electrode connection portion, the central portion being a portion where all of the positive and negative electrode plates and the separator are present, the positive electrode connection portion being a portion where only a part of the electrode active material-uncoated portion of the positive electrode plate, which protrudes toward one side of the central portion, is present, and the negative electrode connection portion being a portion where only a part of the electrode active material-uncoated portion of the negative electrode plate, which protrudes toward another side of the central portion, is present, the method comprising:

winding the positive and negative electrode plates and the separator to form the wound electrode assembly;

cutting unwound portions of the positive and negative electrode plates and the separator such that the separator constitutes an outermost layer of the wound electrode assembly when the winding is completed;

further winding around the wound electrode assembly the cut unwound portions of the positive and negative electrode plates and the separator which connect to the wound electrode assembly;

fixing a part of a terminal end of the separator in a lateral direction to the wound electrode assembly, the terminal end being a cut end of the separator; and performing heat welding on parts of both lateral ends of an outermost portion of the separator in the wound electrode assembly which are located above the electrode active material-uncoated portion of the positive electrode plate or the electrode active material-uncoated portion of the negative electrode plate to fix the lateral ends to the wound electrode assembly;

wherein the heat welding is performed using a probe having a front face at a tip end of the probe, the front face being a tilted surface, and in the heat welding, the front face heated to a temperature equal to or higher than a melting point of the separator is brought into contact with an outer surface of the outermost portion of the separator with a most distal part of the tilted front face of the probe facing a side farther from the electrode active material-coated portions of the positive and negative electrode plates and a most proximal part of the tilted front face of the probe facing a side closer to the electrode active material-coated portions of the positive and negative electrode plates.

2. The method according to claim 1, wherein the part of the terminal end in the lateral direction is fixed to the wound electrode assembly by applying an adhesive tape to the wound electrode assembly such that the adhesive tape extends over the part of the terminal end.

3. A battery, comprising:

a wound electrode assembly formed by winding positive and negative electrode plates and a separator, wherein each of the positive and negative electrode plates is a strip of current collector foil having an electrode active material-coated portion and an electrode active material-uncoated portion, the electrode active material-uncoated portion is located in one lateral end of the current collector foil, the separator is in a form of a strip, the wound electrode assembly has a central portion, a positive electrode connection portion, and a negative electrode connection portion, the central portion is a portion where all of the positive and negative electrode plates and the separator are present, the positive electrode connection portion is a portion where only a part of the electrode active material-uncoated portion of the positive electrode plate which protrudes toward one side of the central portion is present, the negative electrode connection portion is a portion where only a part of the electrode active material-uncoated portion of the negative electrode plate which protrudes toward another side of the central portion is present, the separator constitutes an outermost layer of the wound electrode assembly, and an outermost portion of the separator in the wound electrode assembly has heat welded portions in parts of both lateral ends of the outermost portion, which are located above the electrode active material-uncoated portion of the positive electrode plate or the electrode active material-uncoated portion of the negative electrode plate, the heat welded portions of the separator being fixed to the wound electrode assembly;

wherein the heat welded portions are formed in rows on both lateral sides of the outermost layer of the separator at a plurality of positions from a terminal end side.

4. The battery according to claim 3, further comprising an adhesive tape applied to the wound electrode assembly such that the adhesive tape extends over a part of a terminal end of the separator in the outermost layer of the wound electrode assembly.

* * * * *